United States Patent
Park et al.

(10) Patent No.: US 10,945,117 B1
(45) Date of Patent: Mar. 9, 2021

(54) METHOD AND APPARATUS FOR DETECTING DIAMETER PROTOCOL IDR MESSAGE SPOOFING ATTACK IN MOBILE COMMUNICATION NETWORK

(71) Applicant: KOREA INTERNET & SECURITY AGENCY, Jeollanam-do (KR)

(72) Inventors: Seong Min Park, Jeollanam-do (KR); Young Kwon Park, Jeollanam-do (KR); Bo Min Choi, Jeollanam-do (KR); Eun Hye Ko, Jeollanam-do (KR); Tae Eun Kim, Jeollanam-do (KR); Jin Hyun Cho, Jeollanam-do (KR); Do Won Kim, Jeollanam-do (KR); Hyung Jin Cho, Jeollanam-do (KR); Hwan Kuk Kim, Jeollanam-do (KR)

(73) Assignee: KOREA INTERNET & SECURITY AGENCY, Jeollanam-Do (KR)

(*) Notice: Subject to any disclaimer, the term of this patent is extended or adjusted under 35 U.S.C. 154(b) by 0 days.

(21) Appl. No.: 16/832,747

(22) Filed: Mar. 27, 2020

(30) Foreign Application Priority Data

Nov. 26, 2019 (KR) .......................... 10-2019-0153791

(51) Int. Cl.
*H04W 8/18* (2009.01)
*H04W 8/12* (2009.01)
*H04W 12/06* (2009.01)
*H04W 8/04* (2009.01)
(Continued)

(52) U.S. Cl.
CPC .......... *H04W 8/04* (2013.01); *H04L 61/1588* (2013.01); *H04L 61/6054* (2013.01); *H04L 65/1016* (2013.01); *H04W 8/12* (2013.01); *H04W 8/18* (2013.01); *H04W 12/06* (2013.01)

(58) Field of Classification Search
None
See application file for complete search history.

(56) References Cited

U.S. PATENT DOCUMENTS

2017/0019816 A1* 1/2017 Yuan ..................... H04W 24/04
2019/0373506 A1* 12/2019 Harari ................... H04W 28/08

FOREIGN PATENT DOCUMENTS

| JP | 2019-096918 A | 6/2019 |
| KR | 10-1499022 B | 3/2015 |
| KR | 10-1534160 B | 7/2015 |

(Continued)

OTHER PUBLICATIONS

Mashukov, Sergey, "Diameter Security: An Auditor's Viewpoint," Journal of ICT, vol. 5-1, 53-68, 2017.

*Primary Examiner* — Jason E Mattis
*Assistant Examiner* — Hong Shao
(74) *Attorney, Agent, or Firm* — Sheppard Mullin Richter & Hampton LLP (57) ABSTRACT

Provided are methods of detecting a Diameter spoofing attack. According to an embodiment, the method comprises, obtaining a normal International Mobile Subscriber Identity (IMSI) from a packet of a Diameter S6a protocol transmitted from a Mobile Management Entity (MME) to a Home Subscriber Server (HSS) of a home network, adding a record comprising the normal IMSI to a session table, obtaining an Insert Subscriber Data Request (IDR) message of the Diameter S6a protocol and determining a category of the IDR message.

17 Claims, 8 Drawing Sheets

(51) Int. Cl.
*H04L 29/12* (2006.01)
*H04L 29/06* (2006.01)

(56) References Cited

FOREIGN PATENT DOCUMENTS

| | | |
|---|---|---|
| KR | 10-1534161 B | 7/2015 |
| KR | 10-1536178 B | 6/2016 |
| KR | 10-1711074 B | 2/2017 |
| KR | 10-1835076 B | 4/2018 |
| KR | 10-2018-0074742 A | 7/2018 |

\* cited by examiner

METHOD AND APPARATUS FOR DETECTING DIAMETER PROTOCOL IDR MESSAGE SPOOFING ATTACK IN MOBILE COMMUNICATION NETWORK

CROSS-REFERENCE TO RELATED APPLICATIONS

This application claims the benefit of Korean Patent Application No. 10-2019-0153791, filed on Nov. 26, 2019, in the Korean Intellectual Property Office, the disclosure of which is incorporated herein by reference in its entirety.

BACKGROUND

Field

The present disclosure relates to a method and apparatus for detecting a Diameter protocol spoofing attack, and more particularly, to a method and apparatus for detecting a spoofing attack related to an Insert Subscriber Data Request (IDR) message of a Diameter S6a protocol.

Description of the Related Art

A Diameter protocol (hereinafter, abbreviated to 'Diameter') is an authentication, authorization, and accounting (AAA) protocol used in computer networks. While an SS7 protocol is in charge of the AAA process in second generation (2G) mobile communication and third generation (3G) mobile communication, the Diameter protocol is in charge of the AAA process in fourth generation (4G) mobile communication (LTE) and non-stand-alone fifth generation (5G) mobile communication.

The SS7 protocol is known to have security vulnerabilities. These security vulnerabilities also exist in Diameter. Although the current security standard of Diameter is Internet Protocol Security (IPSec), attackers can still carry out Distributed Denial of Service (DDoS) attacks using similarities between SS7 and Diameter. In addition, they can still perform location tracking even in a mobile communication network to which Diameter has been applied and, as in SS7, can make mobile users have poor connection or intervene in network nodes.

One of the attacks that have a serious effect in the Diameter environment is an attack using an Insert Subscriber Data Request (IDR) message. Based on an attacker computer disguised as a Home Subscriber Server (HSS) sending an IDR message for requesting the update of user data (such as location information and status information) to a Mobile Management Entity (MME), an attacker may receive subscriber location information included in an Insert Subscriber Data Answer (IDA) message in response to the IDR message.

Such an attack using an IDR message can be prevented to some degree by concealing the HSS and the MME in a network and blocking unauthorized access to the HSS and the MME. However, based on an attacker obtaining information about the HSS and the MME and disguises himself or herself as the HSS using the obtained information, there is a possibility that subscriber location information will be stolen by an attack using an IDR message.

SUMMARY

Aspects of the present disclosure provide a method of detecting a location information stealing attack using an Insert Subscriber Data Request (IDR) message in a Diameter environment to respond to the attack, and an apparatus or system employing the method.

Aspects of the present disclosure also provide a method of detecting a location information stealing attack using an IDR message to respond to the attack without modifying a non-stand-alone fifth generation (5G) mobile communication core network, and an apparatus or system employing the method.

Aspects of the present disclosure also provide a method of detecting a location information stealing attack using an IDR message to respond to the attack without receiving any subscriber information from a non-stand-alone 5G mobile communication provider, and an apparatus or system employing the method.

Aspects of the present disclosure also provide a method of detecting various forms of location information stealing attacks using an IDR message, and an apparatus or system employing the method.

Aspects of the present disclosure also provide a method of detecting an IDR message-based location information stealing attack from an attacker device disguised as a Home Subscriber Server (HSS) of a home network to respond to the attack, and an apparatus and system employing the method.

Aspects of the present disclosure also provide a method of detecting an IDR message-based location information stealing attack from an attacker device disguised as an HSS of a visiting network to respond to the attack, and an apparatus and system employing the method.

However, aspects of the present disclosure may not be restricted to the one set forth herein. The above and other aspects of the present disclosure will become more apparent to one of ordinary skill in the art to which the present disclosure pertains by referencing the detailed description of the present disclosure given below.

According to an aspect of the present disclosure, there may be provided a method of detecting a Diameter spoofing attack, the method comprises obtaining a normal International Mobile Subscriber Identity (IMSI) from a packet of a Diameter S6a protocol transmitted from a Mobile Management Entity (MME) to a Home Subscriber Server (HSS) of a home network, adding a record comprising the normal IMSI to a session table, obtaining an Insert Subscriber Data Request (IDR) message of the Diameter S6a protocol and determining a category of the IDR message. The determining the category of the DR message may comprise determining that the IDR message may be an abnormal DR message based on an IMSI included in the IDR message not being found in the session table and determining that the IDR message may be a dangerous IDR message based on some of a bit (bit 2) indicating 'Evolved Packet System (EPS) User State Request' of IDR-Flags, a bit (bit 3) indicating 'EPS Location Information Request' and a bit (bit 4) indicating 'Current Location Request' in the IDR message having a value of '1'. The determining the category of the IDR message may comprise determining that the IDR message may be an abnormal IDR message based on all of the bit (bit 2) indicating 'EPS User State Request' of IDR-Flags, the bit (bit 3) indicating 'EPS Location Information Request' and the bit (bit 4) indicating 'Current Location Request' in the IDR message having the value of '1.'

The obtaining of the normal IMSI may comprise obtaining the normal IMSI included in an Authentication Information Request (AIR) message of the Diameter S6a protocol transmitted from the MME to the HSS of the home network. The obtaining of the normal IMSI further may comprise obtaining an IMSI, which is to be deleted, from a Cancel Location Request (CLR) message of the Diameter S6a protocol transmitted from the MME to the HSS of the home network, and the adding of the record comprising the normal IMSI to the session table comprises searching for a record related to the CLR message and deleting the found record.

The determining the category of the IDR message may comprise determining that the IDR message may be an abnormal IDR message based on an origin-host attribute-value pair (AVP) and an origin-realm AVP included in the IDR message not being included in a preset normal host name list.

The MME may be located in a visiting network.

According to another aspect of the present disclosure, there may be provided a method of detecting a Diameter spoofing attack. The method comprises obtaining a normal IMSI from a Create Session Request message of a General Packet Radio Service (GPRS) Tunneling Protocol for Control plane (GTP-C) protocol generated by an MME obtaining a tunnel ID (Tunnel Endpoint Identifier (TEID)) from a Create Session Response message transmitted in response to the Create Session Request message, adding a record comprising the tunnel ID and the normal IMSI to a session table, obtaining an IDR message of a Diameter S6a protocol and determining that IDR message may be an abnormal IDR message based on an IMSI included in the IDR message not being found in the session table. The tunnel ID (TEID) may be a S11 Serving GateWay (SGW) GTP-C TEID.

The obtaining the tunnel ID may comprise further obtaining an EPS bearer ID (EBI) from the Create Session Request message, and the record added to the session table may comprise a value (IMSI+EBI), which may be generated as a result of concatenating the normal IMSI and the EBI, as a field of the record. the determining that IDR message may be an abnormal IDR message may comprise extracting an IMSI by extracting upper 34 bits from the IMSI+EBI field of each record of the session table; and determining the IDR message to be an abnormal IDR message based on the IMSI included in the IDR message not existing among the extracted IMSIs.

The obtaining of the tunnel ID may comprise obtaining a tunnel ID (TEID) included in a Delete Session Request message of the GTP-C protocol generated by the MME, and the adding of the record comprising the tunnel ID and the normal IMSI to the session table may comprise searching for a record comprising the tunnel ID included in the Delete Session Request message and deleting the found record.

According to still another aspect of the present disclosure, there may be provided a fifth generation (5G) mobile communication system comprising a 5G core network which comprises a packet tapper in a virtual switch, an abnormal packet detection system which analyzes a packet obtained through the packet tapper. The abnormal packet detection system may obtain a normal IMSI from a packet of a Diameter S6a protocol transmitted from an MME to an HSS of a home network and add a record comprising the normal IMSI to a first session table or obtains a normal IMSI from a Create Session Request message packet of a GTP-C protocol generated by the MME and add a record comprising the normal IMSI to a second session table and, based on an IDR message of the Diameter S6a protocol being included in the packet obtained through the packet tapper, determine the IDR message to be an abnormal IDR message based on an IMSI included in the IDR message not being found in any of the first session table and the second session table and determine the IDR message to be a dangerous IDR message based on an IMSI included in the IDR message being found in one of the first session table and the second session table.

The abnormal packet detection system may obtain the normal IMSI included in an AIR message of the Diameter S6a protocol transmitted from the MME to the HSS of the home network.

Based on the IDR message of the Diameter S6a protocol being included in the packet obtained through the packet tapper, the abnormal packet detection system may determine the IDR message to be an abnormal IDR message based on the IMSI included in the IDR message not being found in at least one of the first session table and the second session table or based on an origin-host AVP and an origin-realm AVP included in the IDR message not being included in a preset normal host name list.

Based on the IDR message of the Diameter S6a protocol being included in the packet obtained through the packet tapper, the abnormal packet detection system may determine the IDR message to be a dangerous IDR message based on the IMSI included in the IDR message not being found in at least one of the first session table and the second session table or based on some of a bit (bit 2) indicating 'EPS User State Request' of IDR-Flags, a bit (bit 3) indicating 'EPS Location Information Request' and a bit (bit 4) indicating 'Current Location Request' in the IDR message having a value of '1.'

The MME may be located in a visiting network.

The abnormal packet detection system may further obtain an EBI from the Create Session Request message packet, and the record added to the second session table comprises a value (IMSI+EBI), which may be generated as a result of concatenating the normal IMSI and the EBI, as a field of the record.

The abnormal packet detection system may obtain a tunnel ID (TEID) included in a Delete Session Request message packet of the GTP-C protocol generated by the MME, searches for a record comprising the tunnel ID included in the Delete Session Request message packet, and deletes the found record. The tunnel ID (TED) may be an S11 SGW GTP-C TED.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, embodiments of the present disclosure will be described with reference to the attached drawings. Advantages and features of the present disclosure and methods of accomplishing the same may be understood more readily by reference to the following detailed description of embodiments and the accompanying drawings. The present disclosure may, however, be embodied in many different forms and should not be construed as being limited to the embodiments set forth herein. Rather, these embodiments may be provided so that this disclosure will be thorough and complete and will fully convey the concept of the disclosure to those skilled in the art, and the present disclosure will be defined by the appended claims.

In adding reference numerals to the components of each drawing, it should be noted that the same reference numerals may be assigned to the same components as much as possible even though they are shown in different drawings. In addition, in describing the presently disclosed technology, based on it being determined that the detailed description of the related well-known configuration or function may obscure the gist of the presently disclosed technology, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein may be for the purpose of describing embodiments and may not be intended to be limiting of the presently disclosed technology. In this specification, the singular also includes the plural unless specifically stated otherwise in the phrase.

In addition, in describing the component of this presently disclosed technology, terms, such as first, second, A, B, (a), (b), can be used. These terms may be for distinguishing the components from other components, and the nature or order of the components may not be limited by the terms. Based on a component being described as being "connected," "coupled" or "contacted" to another component, that component may be directly connected to or contacted with that other component, but it should be understood that another component also may be "connected," "coupled" or "contacted" between each component.

A Diameter spoofing attack based on an Insert Subscriber Data Request (IDR) message will be described with reference to FIG. 1. A Home Subscriber Server (HSS) 120 and a Mobile Management Entity (MME) 110 transmit and receive subscriber-related data and location information through S6a protocols 111 and 121 of a Diameter protocol, transmit and receive information used to authorize the access of a subscriber to a visiting network, or transmit and receive user authentication information.

An DR message may be a message of an S6a protocol that the HSS 120 having a subscriber information database (DB) transmits based on requesting the MME 110 to provide subscriber information.

An attacker who has stolen access information for the MME 110 transmits the IDR message to the MME 110 and attempts to steal information contained in an Insert Subscriber Data Request Answer (IDA) received in response to the DR message. That is, an attacker device 130 transmits the IDR message to the MME 110 and receives the IDA message in response to the IDR message. In other words, the attacker device 130 transmits the IDR message by disguising itself as the HSS 120. The IDA message may include sensitive information such as subscriber location information.

Figure 1:
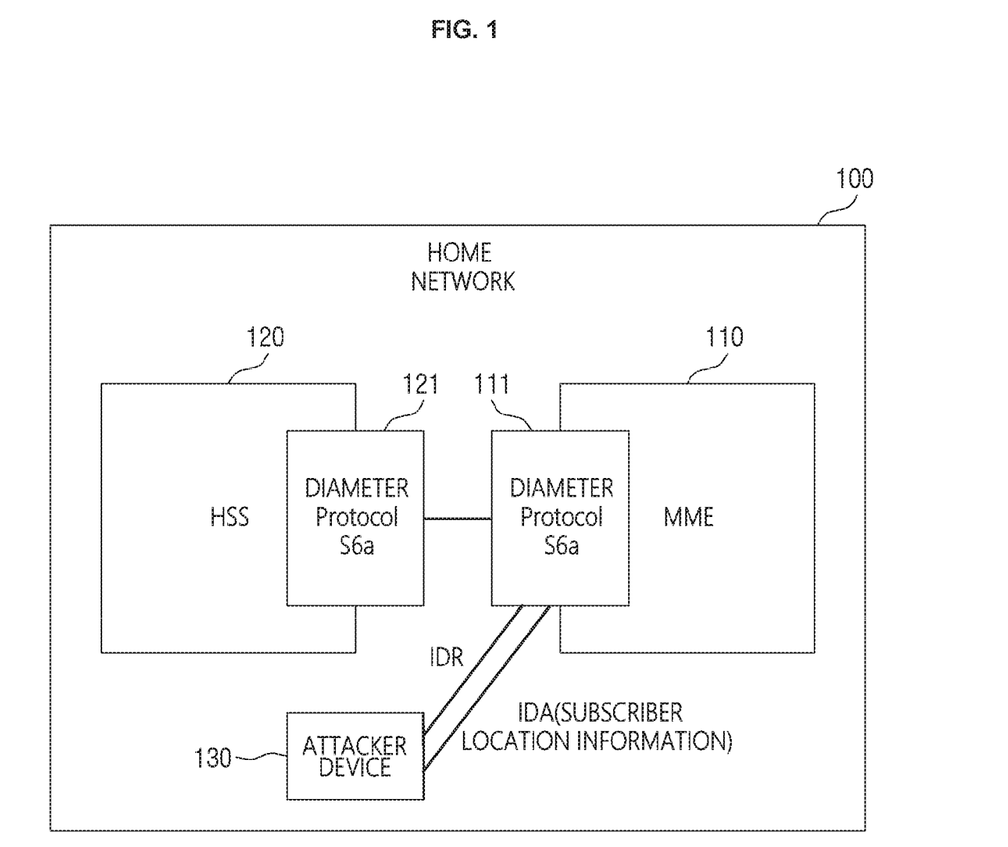
FIGS. 1 and 2 are diagrams for explaining an Insert Subscriber Data Request (IDR) message-based spoofing attack that can be detected according to embodiments.

In FIG. 1, the HSS 120, the attacker device 130, and the MME 110 may all be included in the same home network 100. However, the above-described IDR message-based Diameter spoofing attack may also be introduced from an external network. This will be described with reference to FIG. 2.

Figure 2:
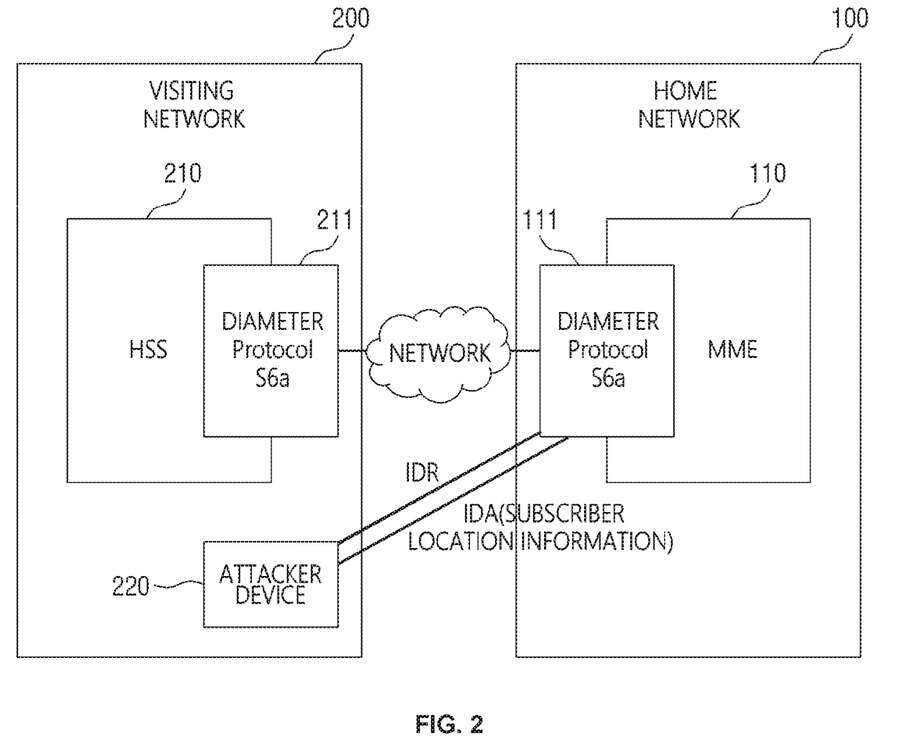

Referring to FIG. 2, an HSS 210 of a visiting network 200 and an MME 110 of a home network 100 transmit and receive authentication, authorization and accounting (AAA)-related data through S6a protocols 211 and 111. This may be intended to support a so-called roaming service. By exploiting this situation, an attacker transmits an IDR message disguised as transmitted by the HSS 210 of the visiting network 200 to the MME 110 of the home network 100, thereby attempting to steal sensitive information such as subscriber location information.

Since it may be difficult for the MME 110 of the home network 100 to exactly know information about the HSS 210 located in the external network, the IDR message may not be properly authenticated. It may be difficult for the MME 110 of the home network 100 to know the authenticity of the IDR message disguised as transmitted by the HSS 210 of the visiting network 200. As a result, an IDA message containing sensitive information such as subscriber location information may be transmitted to an attacker device 220.

Until now, an IDR message-based Diameter spoofing attack has been described with reference to FIGS. 1 and 2. Generally, an attacker cannot attempt the above spoofing attack by stealing all information. At least some of the information contained in the IDR message may be inaccurate. In some embodiments, an IDR message packet containing inaccurate information may be detected to identify an IDR message-based Diameter spoofing attack.

Figure 3:
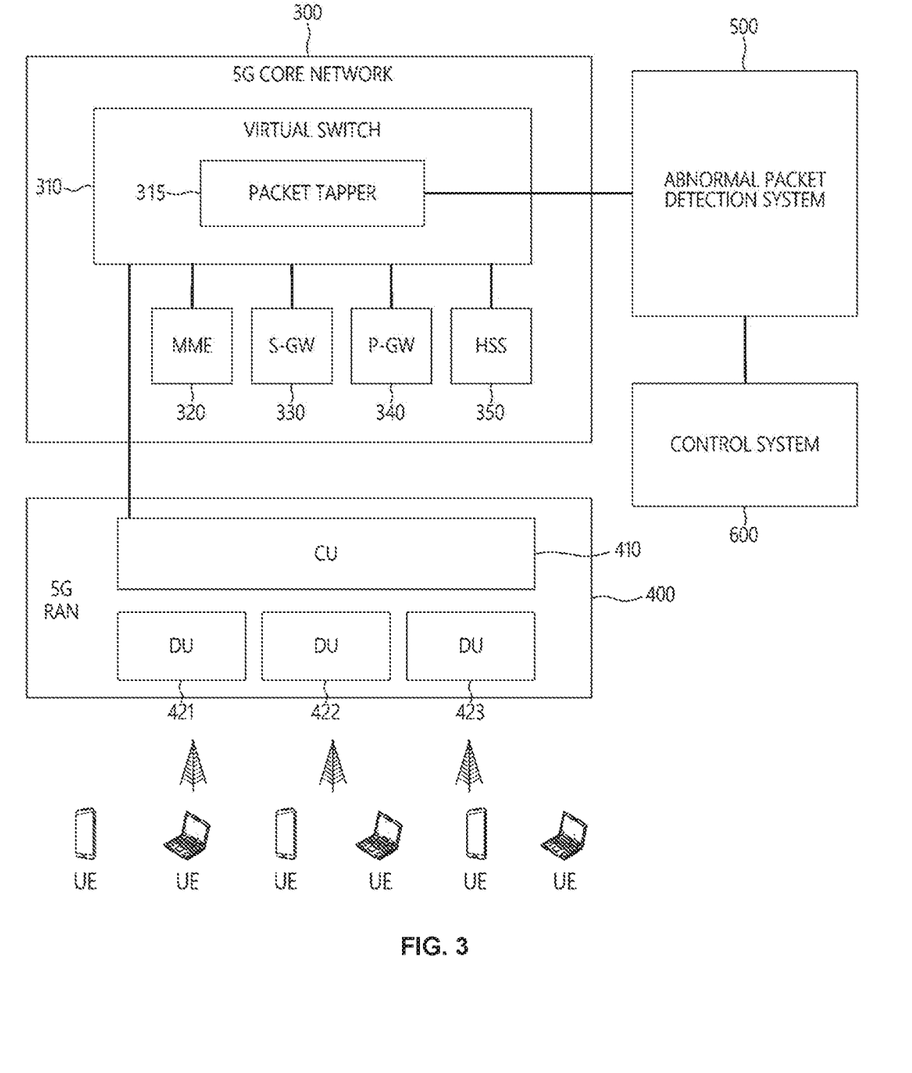
FIG. 3 illustrates the configuration of a fifth generation (5G) mobile communication system according to an embodiment.

The configuration and operation of a fifth generation (5G) mobile communication system according to an embodiment will be described with reference to FIG. 3. The 5G mobile communication system according to the current embodiment operates in a non-stand-alone manner.

A 5G Radio Access Network (RAN) 400 including a central unit (CU) 410 and one or more distributed units (DUs) 421 through 423 may be wirelessly connected to user equipment (UE) via a base station. The 5G RAN 400 may be connected to a virtual switch 310 of a 5G core network 300. The virtual switch 310 may be connected to an MME 320, a Serving GateWay (S-GW) 330, a Packet data network GateWay (P-GW) 340, and an HSS 350. Since the 5G RAN 400 and the 5G core network 300 may not be substantially different in configuration and operation from a non-stand-alone 5G mobile communication system, published documents may be referred to for details for understanding the technical spirit of the present disclosure.

The virtual switch 310 according to the current embodiment includes a packet tapper 315 that copies a packet passing along a network link in an electrical manner in real time. The packet tapper 315 provides an abnormal packet detection system 500 with packets transmitted and received in the 5G core network 300. The abnormal packet detection system 500 receives the packets and does not transmit any packets to the 5G core network 300.

According to the configuration of the 5G mobile communication system according to the current embodiment, there may be no need for any configuration change or addition of logic to the 5G core network 300 for a stable operation, and no additional packets related to abnormal packet detection may be introduced into the 5G core network 300. Instead, by simply providing packets to the abnormal packet detection system 500 using the packet tapper 315, it may be possible to detect the above-described IDR message-based Diameter spoofing attack.

The abnormal packet detection system 500 may obtain a normal International Mobile Subscriber Identity (IMSI) from a packet of a Diameter S6a protocol transmitted from an MME 320 to an HSS 350 of a home network and add a record including the normal IMSI to a first session table.

In addition, the abnormal packet detection system 500 may obtain a normal IMSI, an Evolved-Universal Terrestrial Access Network (E-UTRAN) Cell Global Identifier (ECGI) and a Tracking Area Identity (TAI) from a Create Session Request message of a General Packet Radio Service (GPRS) Tunneling Protocol for Control plane (GTP-C) protocol generated by the MME 320 and add a record including the normal IMSI, the ECGI and the TAI to a second session table.

The abnormal packet detection system 500 may manage at least one of the first session table and the second session table.

Based on a packet obtained through the packet tapper 315 including an DR message of the Diameter S6a protocol, the abnormal packet detection system 500 may determine the IDR message to be an abnormal IDR message or a dangerous IDR message based on an IMSI included in the IDR message not being found in at least one of the first session table and the second session table, based on an origin-host attribute-value pair (AVP) and an origin-realm AVP included in the IDR message not being included in a preset normal host name list, or based on some of a bit (bit 2) indicating 'Evolved Packet System (EPS) User State Request' of IDR-Flags, a bit (bit 3) indicating 'EPS Location Information Request' and a bit (bit 4) indicating 'Current Location Request' in the IDR message having a value of '1.'

For example, based on the IMSI included in the IDR message being found in one of the first session table and the second session table, the abnormal packet detection system 500 may determine the IDR message to be a dangerous IDR message.

For example, based on the IMSI included in the IDR message being not found in any of the first session table and the second session table, the abnormal packet detection system 500 may determine the IDR message to be an abnormal IDR message.

For example, based on some of the bit (bit 2) indicating 'EPS User State Request' of IDR-Flags, the bit (bit 3) indicating 'EPS Location Information Request' and the bit (bit 4) indicating 'Current Location Request' in the IDR message having a value of '1,' the abnormal packet detection system 500 may determine the IDR message to be a dangerous IDR message.

For example, based on all of the bit (bit 2) indicating 'EPS User State Request' of IDR-Flags, the bit (bit 3) indicating 'EPS Location Information Request' and the bit (bit 4) indicating 'Current Location Request' in the IDR message having a value of '1,' the abnormal packet detection system 500 may determine the IDR message to be an abnormal IDR message.

For example, based on the origin-host AVP and the origin-realm AVP included in the IDR message not being included in the preset normal host name list, the abnormal packet detection system 500 may determine the IDR message to be an abnormal IDR message.

Based on the abnormal packet detection system 500 detecting a dangerous DR message or an abnormal DR message, it may package information related to the detected DR message by using the first session table or the second session table and provide the packaged information to a control system 600.

In addition, in some embodiments, as described with reference to FIG. 3, based on the abnormal packet detection system 500 detecting a dangerous IDR message or an abnormal IDR message, it notifies the 5G core network 300 of the detected dangerous or abnormal IDR message so that the 5G core network 300 can take a defense process such as ignoring the dangerous IDR message or the abnormal IDR message.

The configuration and operation of the abnormal packet detection system 500 may be understood more clearly with reference to a method of detecting a Diameter spoofing attack which will be described below with reference to FIGS. 4 through 7.

A method of detecting a Diameter spoofing attack will now be described with reference to FIGS. 4 through 7. The method of detecting a Diameter spoofing attack according to the current embodiment may be performed by a computing device. For example, the computing device may be one physical server or a plurality of virtual servers. For example, the computing device may be part of a computing device existing in the abnormal packet detection system 500 of FIG. 3.

Based on the subject of each operation being omitted in the description of the method of detecting a Diameter spoofing attack according to the current embodiment, it may be the computing device.

Figure 4:
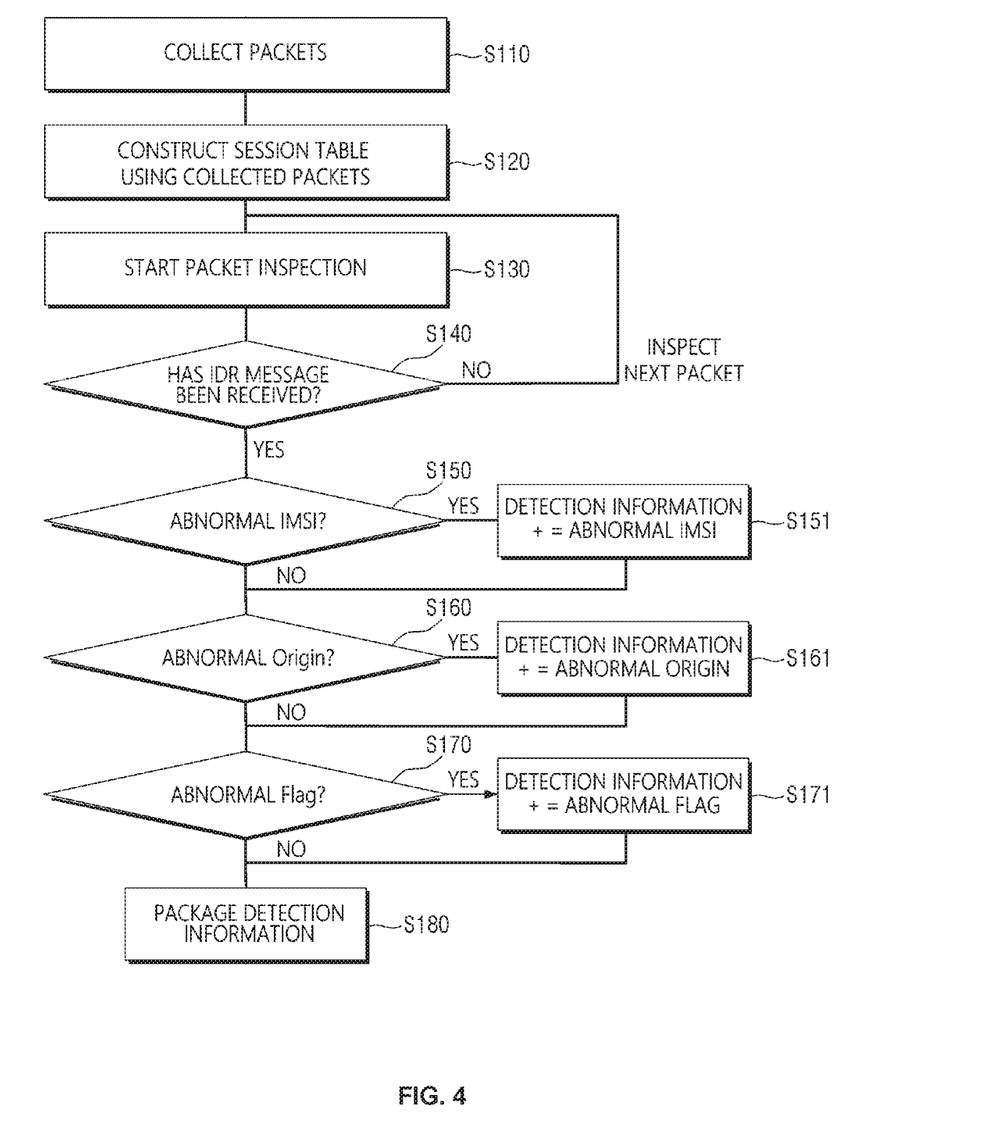
FIG. 4 is a flowchart illustrating a method of detecting a Diameter spoofing attack according to an embodiment.

Referring to FIG. 4, in operation S110, packets may be collected in a 5G core network. Since the current embodiment may be for detecting a Diameter spoofing attack, packets may also be collected in a fourth generation (4G) core network to which a Diameter protocol may be applied.

In operation S120, a session table may be constructed using the collected packets. The construction of the session table may be performed periodically or aperiodically. The construction of the session table may include at least part of the construction of a first session table and the construction of a second session table.

The first session table may be constructed using packets collected based on normal messages of an S6a protocol being transmitted and received. In addition, the second session table may be constructed using packets collected based on normal messages according to a GTP-C protocol being transmitted and received.

The normal messages of the S6a protocol and the normal messages according to the GTP-C protocol may be understood as being generated commonly based on user equipment UE connecting to a network, moves, and disconnects from the network.

First, an operation of managing the first session table will be described using the example configuration of the first session table of FIG. 5A and a signal flowchart of a normal message of the S6a protocol of FIG. 6.

Figure 5A:
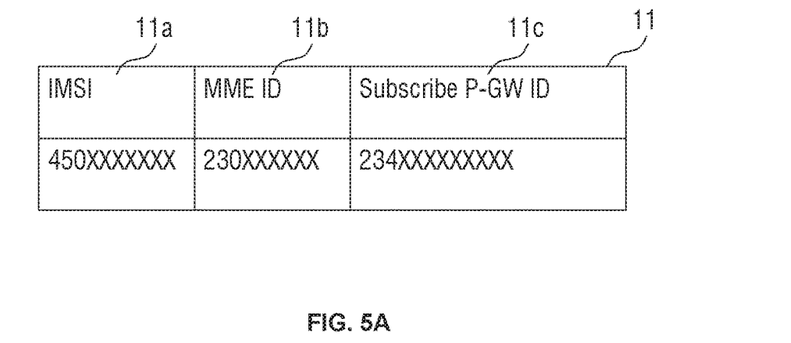
FIG. 5A illustrates the example configuration of a first session table that is generated and referred to in some embodiments.

Referring to FIG. 5A, a first session table 11 includes IMSI 11a. Since an IMSI may be user identification information not disclosed to the outside world, it may not be easy for an attacker to steal the IMSI. An IMSI that the attacker includes in an IDR message for a Diameter spoofing attack may be an IMSI generated arbitrarily. The DR message including the arbitrarily generated IMSI may be highly likely to be used for a spoofing attack.

To determine whether an IMSI may be an arbitrarily generated IMSI or a normal IMSI without information provided by a mobile communication provider, normal messages of the S6a protocol may be collected, and normal IMSIs may be extracted from the collected normal messages and managed in the current embodiment. Later, based on an IDR message being checked, based on an IMSI included in the IDR message not existing among normal IMSIs 11a included in the first session table 11, the IMSI included in the IDR message may be determined to be abnormal.

Figure 6:
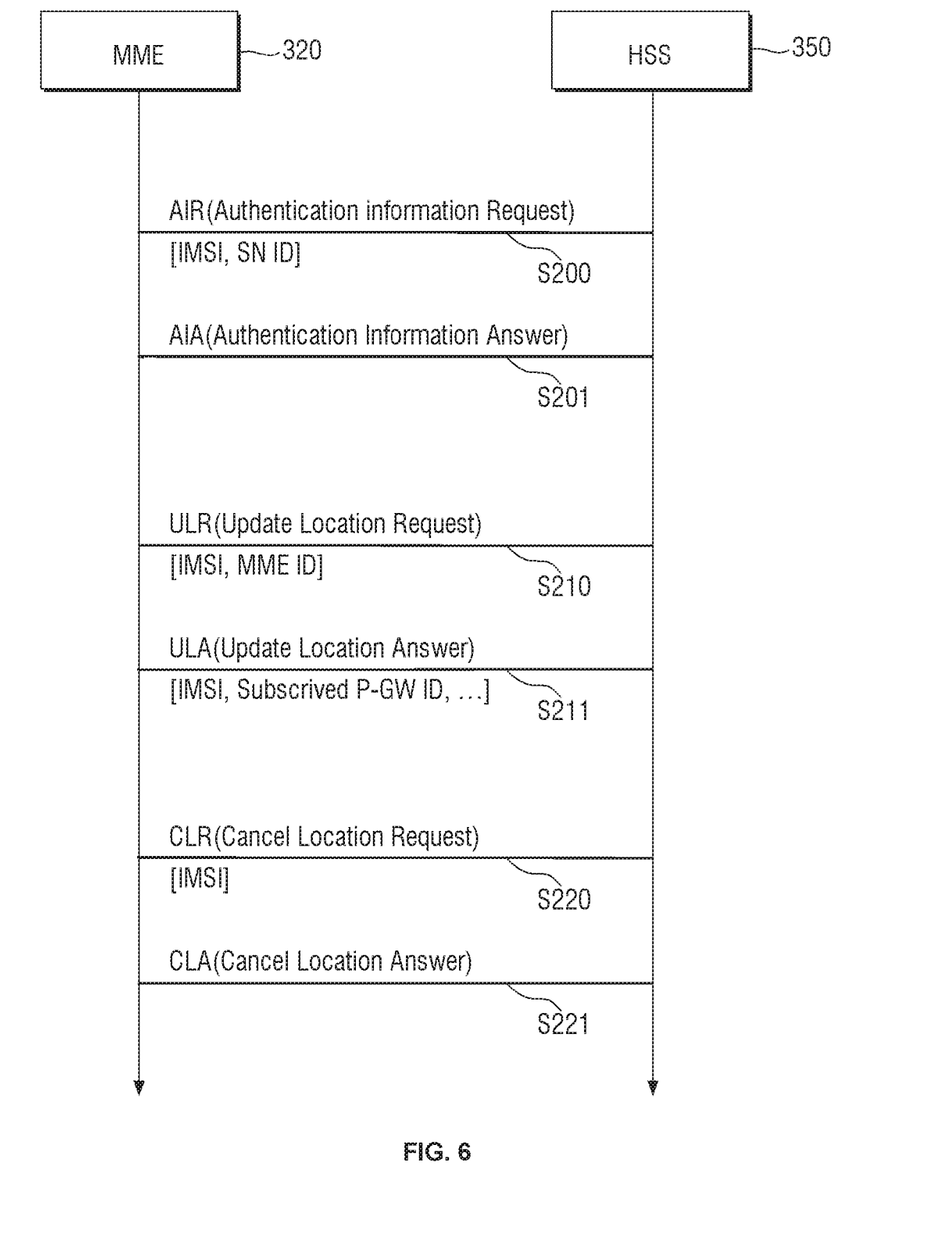
FIG. 6 illustrates an example S6a protocol message flow between a Mobile Management Entity (MME) and a Home Subscriber Server (HSS) based on a record of the first session table being added, updated, and deleted.

Referring to FIG. 6, an Authentication Information Request (AIR) message may be transmitted from an MME 320 to an HSS 350 in the process of authenticating a subscriber device attempting to connect to a network (operation S200). The AIR message includes, as parameters, an IMSI and a server name identifier (SN ID) (Public Land Mobile Network (PLMN) of a network to which the subscriber device may be connected). In response to the AIR message, an Authentication Information Answer (AIA) message may be transmitted from the HSS 350 to the MME 320 (operation S201).

Based on an AIR message packet being found in the constructing of the session table using the collected packets (operation S120), the parameters of the AIR message may be temporarily stored in a buffer. Based on an AIA message packet being found, a new record including the IMSI stored in the buffer may be created based on the AIA message packet corresponding to the parameters of the AIR message stored in the buffer. The new record may be stored in the first session table 11 after whether a record of the same IMSI exists in the first session table 11 may be checked.

The first session table 11 may further include MME ID 11b and Subscribe P-GW ID 11c to manage information about abnormal packets.

Referring to FIG. 6, based on the handover of the subscriber device occurring, an Update Location Request (ULR) message may be transmitted from the MME 320 to the HSS 350 (operation S210). The ULR message includes, as parameters, an IMSI and an MME ID (an MME ID of a network to which the subscriber device may be newly connected). In response to the ULR message, an Update Location Answer (ULA) message may be transmitted from the HSS 350 to the MME 320 (operation S211).

Based on an ULR message packet being found in the constructing of the session table using the collected packets (operation S120), the parameters of the ULR message may be temporarily stored in the buffer. Based on an ULA message packet being found, an existing record including the IMSI stored in the buffer may be searched for based on the ULA message packet corresponding to the parameters of the ULR message stored in the buffer. The MME ID included in the ULR message may be added as an MME ID of the found existing record. The ULA message packet includes a Subscribed P-GW ID as a parameter. The Subscribed P-GW ID included in the ULA message may also be added as a Subscribed P-GW ID of the found existing record.

Referring to FIG. 6, a Cancel Location Request (CLR) message may be transmitted from the MME 320 to the HSS 350 based on the subscriber device getting detached from the network by, for example, cutting off the power (operation S220). The CLR message includes an IMSI as a parameter. In response to the CLR message, a Cancel Location Answer (CLA) message may be transmitted from the HSS 350 to the MME 320 (operation S221).

Based on a CLR message packet being found in the constructing of the session table using the collected packets (operation S120), the parameters of the CLR message may be temporarily stored in the buffer. Based on a CLA message packet being found, an existing record including the IMSI stored in the buffer may be searched for based on the CLA message packet corresponding to the parameters of the CLR message stored in the buffer. The found existing record may be deleted from the first session table 11. It may be possible to detect a Diameter spoofing attack carried out using an IMSI of a subscriber who has already been detached or unsubscribed from the network.

Next, an operation of managing the second session table will be described using the example configuration of the second session table of FIG. 5B and a signal flowchart of a normal message of the GTP-C protocol of FIG. 7.

Figure 5B:
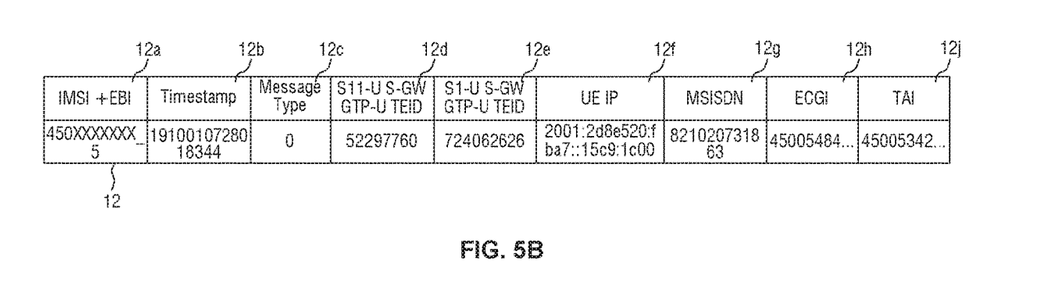
FIG. 5B illustrates the example configuration of a second session table that is generated and referred to in some embodiments.

Referring to FIG. 5B, a second session table 12 includes a field 12a in which IMSI and EPS bearer ID (EBI) may be concatenated. Since an IMSI may be user identification information not disclosed to the outside world, it may not be easy for an attacker to steal the IMSI. An IMSI that the attacker includes in an IDR message for a Diameter spoofing attack may be an IMSI generated arbitrarily. The IDR message including the arbitrarily generated IMSI may be highly likely to be used for a spoofing attack.

According to the GTP-C protocol, a plurality of EPS bearer IDs may be assigned to the same IMSI. Not IMSI but a value obtained by concatenating EBI to IMSI forms one field in the second session table 12.

To determine whether an IMSI may be an arbitrarily generated IMSI or a normal IMSI without information provided by a mobile communication provider, normal messages of the GTP-C protocol may be collected, and normal IMSIs may be extracted from the collected normal messages and managed in the current embodiment. Later, based on an IDR message being checked, based on an IMSI included in the IDR message not existing among normal IMSIs obtained by extracting upper 34 bits (number of IMSI bits) from the IMSI+EBI field 12a included in the second session table 12, the IMSI included in the IDR message may be determined to be abnormal.

Figure 7:
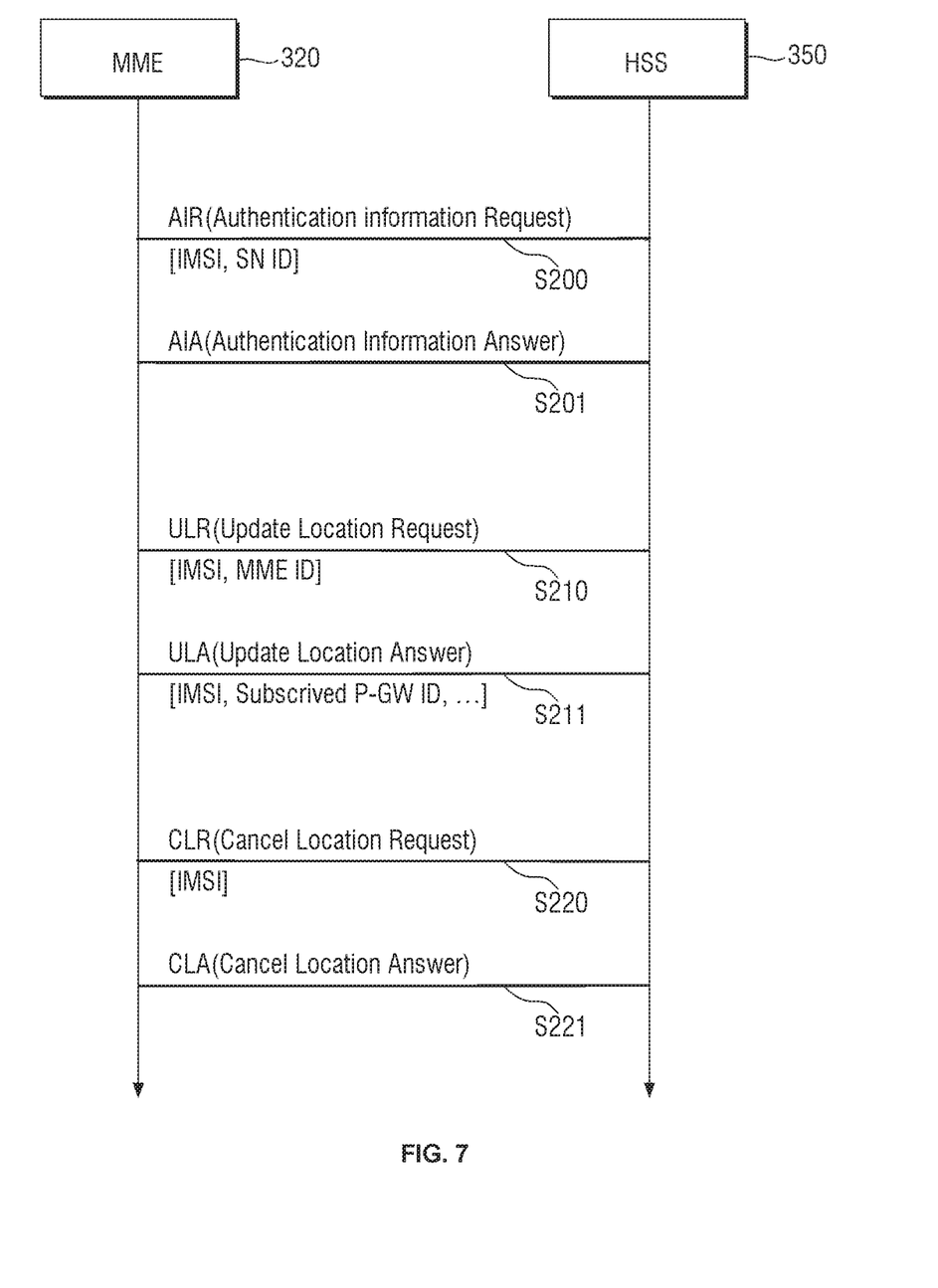
FIG. 7 illustrates an example S6a protocol message flow between the MME, a Serving GateWay (GS-GW) and a Packet data network GateWay (P-GW) based on a record of the second session table being added, updated, and deleted.

Referring to FIG. 7, a Create Session Request message may be transmitted from the MME 320 to an S-GW 330 in the process of establishing an EPS session in which a subscriber device can connect to a network (operation S300) and then transmitted from the S-GW 330 to a P-GW 340 (operation S301). The Create Session Request message transmitted from the MME 320 to the S-GW 330 may include, as parameters, an IMSI and an EPS bearer ID, a Mobile Station International Subscriber Directory Number (MSISDN) (subscriber identification information), an ECGI, and a TAI. The Create Session Request message transmitted from the S-GW 330 to the P-GW 340 may include an S11 S-GW GTP-C Tunnel Endpoint Identifier (TEID) (tunnel ID) as a parameter.

In some embodiments, the Create Session Request message transmitted from the S-GW 330 to the P-GW 340 may not include the S11 S-GW GTP-C TEID as a parameter, and a Create Session Response message transmitted from the P-GW 340 to the S-GW 330 may include the S11 S-GW GTP-C TEID as a parameter.

The S11 S-GW GTP-C TEID may be understood as a tunnel ID for S11 interface-based communication between the MME and the S-GW. Since none of a Modify Bearer Request message and a Delete Session Request message to be described later includes an IMSI as a parameter, the S11 S-GW GTP-C TEID included in both the Modify Bearer Request message and the Delete Session Request message as a parameter may play a role in record search.

The MSISDN may be subscriber identification information and may be included in the second session table as a field 12g to provide additional information about abnormal IDR packets.

The ECGI and the TAI may be information used to identify a base station to which the subscriber device may be connected and may be included in the second session table as fields 12h and 12i to provide additional information about abnormal IDR packets.

Various tunnel IDs (TEIDs) collected from parameters of GTP for User plane (GTP-U) protocol messages, such as an S1-U S-GW GTP-U TEID, may also be included in the second session table as a field to provide information about the abnormal IDR packets. In FIG. 5B, an S1-U S-GW GTP-U TEID field 12e may be illustrated as an example field.

In response to the Create Session Request, the Create Session Response message may be transmitted from the P-GW 340 to the S-GW 330 and then from the S-GW 330 to the MME 320 (operation S302).

Based on a Create Session Request message packet being found in the constructing of the session table using the collected packets (operation S120), the parameters of the Create Session Request message may be temporarily stored in the buffer. Based on a Create Session Response message packet being found, a new record including the IMSI+EBI stored in the buffer may be created based on the Create Session Response message packet corresponding to the parameters of the Create Session Request message stored in the buffer. The new record may be stored in the second session table 12 after whether a record of the same IMSI+ EBI exists in the second session table 12 may be checked.

In addition, in some embodiments, a new record including the IMSI+EBI field generated using the IMSI and the EBI included in the Create Session Request message transmitted from the MME 320 to the S-GW 330 may be created, and an 'S11 S-GW GTP-C TEID' value of the new record may be obtained from the 'S11 S-GW GTP-C TEID' parameter included in the Create Session Response message transmitted from the P-GW 340 to the S-GW 330.

It may be understood that in the record of the second session table 12, the two fields 'IMSI+EBI' 12a and 'S11 S-GW GTP-C TEID' 12d may be required fields, and the other fields may be reference information.

Referring to FIG. 7, based on a handover of the subscriber device occurring, a Modify Bearer Request message may be transmitted from the MME 320 to the S-GW 330 (operation S310). The Modify Bearer Request message may include, as parameters, an EPS bearer ID, an S11 S-GW GTP-C TEID, and an ECGI and a TAI related to a newly connected base station. In response to the Modify Bearer Request message, a Modify Bearer Response message may be transmitted from the S-GW 330 to the MME 320 (operation S311).

Based on a Modify Bearer Request message packet being found in the constructing of the session table using the collected packets (operation S120), the parameters of the Modify Bearer Request message may be temporarily stored in the buffer. Based on a Modify Bearer Response message packet being found, an existing record including the S11 S-GW GTP-C TEID stored in the buffer may be searched for based on the Modify Bearer Response message packet corresponding to the parameters of the Modify Bearer Request message stored in the buffer.

The values of the ECGI field 12h and the TAI field 12i of the found existing record may be updated to those included in the Modify Bearer Request message. Through this operation, each record of the second session table 12 may be updated with the latest information related to a connected cell in each session.

Referring to FIG. 7, a Delete Session Request message may be transmitted from the MME 320 to the S-GW 330 based on the subscriber device getting detached from the network by, for example, cutting off the power (operation S320) and then transmitted from the S-GW 330 to the P-GW 340 (operation S321). The Delete Session Request message may include an EPS bearer ID and an S11 S-GW GTP-C TEID as parameters.

In response to the Delete Session Request message, a Delete Session Response message may be transmitted from the P-GW 340 to the S-GW 330 and then from the S-GW 330 to the MME 320 (operation S322).

Based on a Delete Session Request message packet being found in the constructing of the session table using the collected packets (operation S120), an existing record including the S11 S-GW GTP-C TED which may be a parameter of the Delete Session Request message may be searched for. The found existing record may be deleted from the second session table 12. It may be possible to detect a Diameter spoofing attack carried out using an IMSI of a subscriber who has already been detached or unsubscribed from the network.

Until now, the operations related to constructing and updating the first session table 11 and the second session table 12 have been described. The following operations will be described by returning to FIG. 4.

In operation S130, packet inspection may be started. The packet inspection may be performed in real time or may be performed in a batch manner based on a predetermined number of packets being collected.

Based on a packet to be inspected being an IDR message (command code 319) of the S6a protocol, parameters of the IDR message may be inspected.

In inspection of an IMSI parameter in operation S150, based on an IMSI parameter not being found in at least one of the first session table 11 and the second session table 12 may be detected, the IDR message may be determined to be an abnormal message or a dangerous message and thus added to detection information in operation S151.

In inspection of an origin-host parameter and an origin-realm parameter in operation S160, based on information about a host not registered with a public institution being detected in the IDR message, the IDR message may be determined to be an abnormal message or a dangerous message and thus added to detection information in operation S161.

In inspection of a flag parameter in operation S170, based on some of a bit (bit 2) indicating 'EPS User State Request' of IDR-Flags, a bit (bit 3) indicating 'EPS Location Information Request' and a bit (bit 4) indicating 'Current Location Request' in the IDR message having a value of '1,' the IDR message may be determined to be a dangerous DR message. Here, based on all of the bit (bit 2) indicating 'EPS User State Request' of IDR-Flags, the bit (bit 3) indicating 'EPS Location Information Request' and the bit (bit 4) indicating 'Current Location Request' in the DR message having a value of '1,' the IDR message may be determined to be an abnormal IDR message. The flag parameter information of the dangerous or abnormal IDR message may be added to the detection information in operation S171.

Next, the detection information may be packaged in a predetermined format and then stored or transmitted to an external device in operation S180.

So far, various embodiments included in the technical features of the present disclosure and effects according to the embodiments have been described. The computer readable recording medium may be, for example, a removable recording medium (CD, DVD, Blu-ray disc, USB storage device, removable hard disk) or a fixed recording medium (ROM, RAM, computer equipped hard disk). The computer program recorded on the computer readable recording medium may be transmitted to other computing device via a network such as internet and installed in the other computing device, thereby being used in the other computing device.

Hereinafter, an exemplary computing device 500 that can implement an apparatus and a system, according to various embodiments of the present disclosure will be described with reference to FIG. 8.

Figure 8:
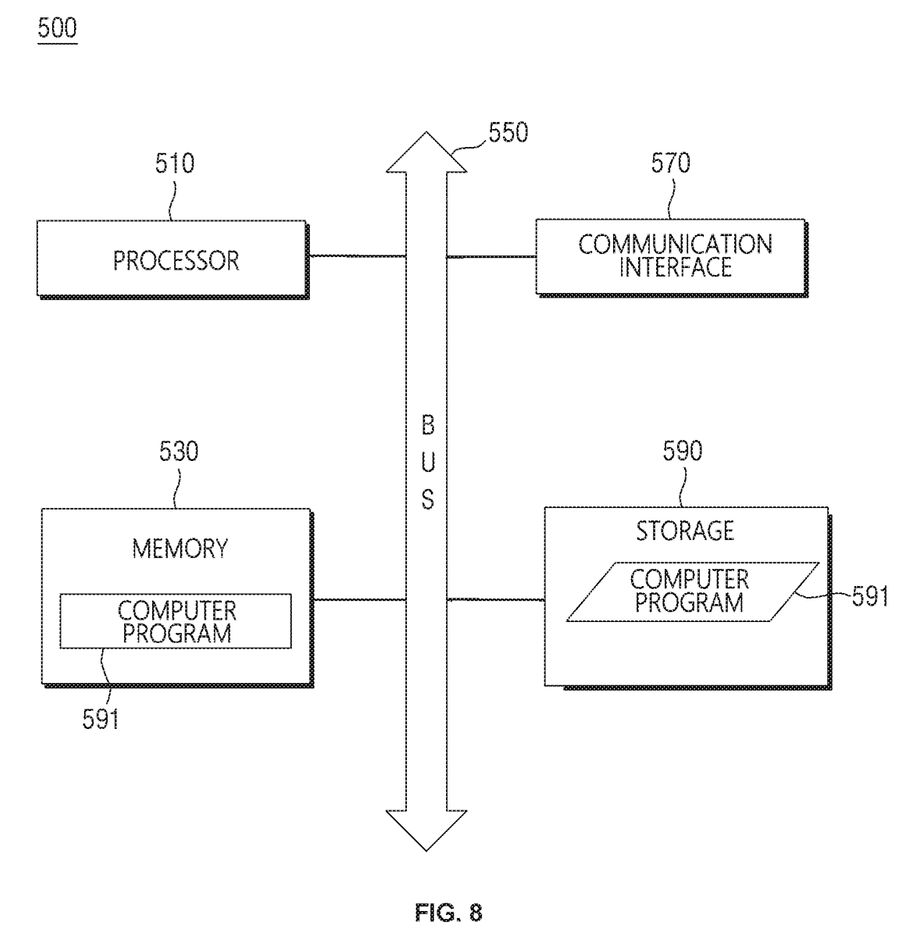
FIG. 8 illustrates an example hardware structure for implementing a method according to embodiments.

FIG. 8 is an example hardware diagram illustrating a computing device 500.

As shown in FIG. 8, the computing device 500 may include one or more processors 510, a bus 550, a communication interface 570, a memory 530, which loads a computer program 591 executed by the processors 510, and a storage 590 for storing the computer program 591. However, FIG. 8 illustrates the components related to the embodiment of the present disclosure. It should be appreciated by those skilled in the art that the present disclosure may further include other general purpose components in addition to the components shown in FIG. 8.

The processor 510 controls overall operations of each component of the computing device 500. The processor 510 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 510 may perform calculations on at least one application or program for executing a method/operation according to various embodiments of the present disclosure. The computing device 500 may have one or more processors.

The memory 530 stores various data, instructions and/or information. The memory 530 may load one or more programs 591 from the storage 590 to execute methods/operations according to various embodiments of the present disclosure. For example, based on the computer program 591 being loaded into the memory 530, the logic (or the module) as shown in FIG. 4 may be implemented on the memory 530. An example of the memory 530 may be a RAM, but is not limited thereto.

The bus 550 provides communication between components of the computing device 500. The bus 550 may be implemented as various types of bus such as an address bus, a data bus and a control bus.

The communication interface 570 supports wired and wireless internet communication of the computing device 500. The communication interface 570 may support various communication methods other than internet communication. To this end, the communication interface 570 may be configured to comprise a communication module well known in the art of the present disclosure.

The storage 590 can non-temporarily store one or more computer programs 591. The storage 590 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 591 may include one or more instructions, on which the methods/operations according to various embodiments of the present disclosure may be implemented. Based on the computer program 591 being loaded on the memory 530, the processor 510 may perform the methods/operations in accordance with various embodiments of the present disclosure by executing the one or more instructions.

Although the operations may be shown in an order in the drawings, those skilled in the art will appreciate that many variations and modifications can be made to the embodiments without substantially departing from the principles of the presently disclosed technology. The disclosed embodiments of the presently disclosed technology may be used in a generic and descriptive sense and not for purposes of limitation. The scope of protection of the presently disclosed technology should be interpreted by the following claims, and all technical ideas within the scope equivalent thereto should be construed as being included in the scope of the technical idea defined by the present disclosure.

What is claimed is:

1. A method of detecting a Diameter spoofing attack, the method comprising:
obtaining a normal International Mobile Subscriber Identity (IMSI) from a packet of a Diameter S6a protocol transmitted from a Mobile Management Entity (MME) to a Home Subscriber Server (HSS) of a home network;
adding a record comprising the normal IMSI to a session table;
obtaining an Insert Subscriber Data Request (IDR) message of the Diameter S6a protocol; and
determining a category of the IDR message,
wherein the determining the category of the IDR message comprises,
determining that the IDR message is an abnormal IDR message based on an IMSI included in the IDR message not being found in the session table, and
determining that the IDR message is a dangerous IDR message based on some of a bit (bit 2) indicating 'Evolved Packet System (EPS) User State Request' of IDR-Flags, a bit (bit 3) indicating 'EPS Location Information Request' and a bit (bit 4) indicating 'Current Location Request' in the IDR message having a value of '1'.

2. The method of claim 1, wherein the obtaining of the normal IMSI comprises obtaining the normal IMSI included in an Authentication Information Request (AIR) message of the Diameter S6a protocol transmitted from the MME to the HSS of the home network.

3. The method of claim 2, wherein the obtaining of the normal IMSI further comprises obtaining an IMSI, which is to be deleted, from a Cancel Location Request (CLR) message of the Diameter S6a protocol transmitted from the MME to the HSS of the home network, and the adding of the record comprising the normal IMSI to the session table comprises searching for a record related to the CLR message and deleting the found record.

4. The method of claim 1, wherein the determining the category of the IDR message comprises determining that the IDR message is an abnormal IDR message based on an origin-host attribute-value pair (AVP) and an origin-realm AVP included in the IDR message not being included in a preset normal host name list.

5. The method of claim 1, wherein the determining the category of the IDR message comprises determining that the IDR message is an abnormal IDR message based on all of the bit (bit 2) indicating 'EPS User State Request' of IDR-Flags, the bit (bit 3) indicating 'EPS Location Information Request' and the bit (bit 4) indicating 'Current Location Request' in the IDR message having the value of '1'.

6. The method of claim 1, wherein the MME is located in a visiting network.

7. A method of detecting a Diameter spoofing attack using a message of a GTP-C protocol, the method comprising:
   obtaining a normal IMSI from a Create Session Request message of a General Packet Radio Service (GPRS) Tunneling Protocol for Control plane (GTP-C) protocol generated by an MME;
   obtaining a first tunnel ID (Tunnel Endpoint Identifier (TEID)) from a Create Session Response message transmitted in response to the Create Session Request message, the first tunnel ID being a S11 Serving GateWay (SGW) GTP-C TEID;
   adding a record comprising the first tunnel ID and the normal IMSI to a session table;
   obtaining a second tunnel ID (TEID) included in a Delete Session Request message of the GTP-C protocol generated by the MME, the second tunnel ID being a S11 SGW GTP-C TEID, the Delete Session Request message not including an IMSI;
   deleting a record comprising the second tunnel ID included in the Delete Session Request message from the session table;
   obtaining an IDR message of a Diameter S6a protocol; and
   determining that the IDR message of the Diameter S6a protocol is an abnormal IDR message based on an IMSI included in the IDR message not being found in the session table, the session table not including information obtained from a packet of a Diameter S6a protocol.

8. The method of claim 7, wherein the obtaining the first tunnel ID comprises further obtaining an EPS bearer ID (EBI) from the Create Session Request message, and the record added to the session table comprises a value (IMSI+EBI), which is generated as a result of concatenating the normal IMSI and the EBI, as a field of the record.

9. The method of claim 8, wherein the determining that IDR message is an abnormal IDR message comprises:
   extracting an IMSI by extracting upper 34 bits from the IMSI+EBI field of each record of the session table; and
   determining the IDR message to be an abnormal IDR message based on the IMSI included in the IDR message not existing among the extracted IMSIs.

10. A fifth generation (5G) mobile communication system comprising:
    a 5G core network which comprises a packet tapper in a virtual switch;
    an abnormal packet detection system which analyzes a packet obtained through the packet tapper,
    wherein the abnormal packet detection system is configured to:
        obtain a first normal IMSI from a packet of a Diameter S6a protocol transmitted from an MME to an HSS of a home network and add a record comprising the first normal IMSI to a first session table;
        obtain a second normal IMSI from a Create Session Request message packet of a GTP-C protocol generated by the MME and add a record comprising the second normal IMSI to a second session table, and
        based on an IDR message of the Diameter S6a protocol being included in the packet obtained through the packet tapper,
            determine the IDR message to be an abnormal IDR message based on an IMSI included in the IDR message being found in none of the first session table and the second session table, otherwise determine the IDR message to be a dangerous IDR message based on an IMSI included in the IDR message being found in either one of the first session table and the second session table.

11. The system of claim 10, wherein the abnormal packet detection system obtains the first normal IMSI included in an AIR message of the Diameter S6a protocol transmitted from the MME to the HSS of the home network.

12. The system of claim 10, wherein based on the IDR message of the Diameter S6a protocol being included in the packet obtained through the packet tapper, the abnormal packet detection system determines the IDR message to be an abnormal IDR message based on the IMSI included in the IDR message not being found in at least one of the first session table and the second session table or based on an origin-host AVP and an origin-realm AVP included in the IDR message not being included in a preset normal host name list.

13. The system of claim 10, wherein based on the IDR message of the Diameter S6a protocol being included in the packet obtained through the packet tapper, the abnormal packet detection system determines the IDR message to be a dangerous IDR message based on the IMSI included in the IDR message not being found in at least one of the first session table and the second session table or based on some of a bit (bit 2) indicating 'EPS User State Request' of IDR-Flags, a bit (bit 3) indicating 'EPS Location Information Request' and a bit (bit 4) indicating 'Current Location Request' in the IDR message having a value of '1'.

14. The system of claim 10, wherein the MME is located in a visiting network.

15. The system of claim 10, wherein the abnormal packet detection system further obtains an EBI from the Create Session Request message packet, and the record added to the second session table comprises a value (IMSI+EBI), which is generated as a result of concatenating the second normal IMSI and the EBI, as a field of the record.

16. The system of claim 10, wherein the abnormal packet detection system obtains a tunnel ID (TEID) included in a Delete Session Request message packet of the GTP-C protocol generated by the MME, searches for a record comprising the tunnel ID included in the Delete Session Request message packet, and deletes the found record.

17. The system of claim 10, wherein the tunnel ID (TEID) is an S11 SGW GTP-C TEID.

* * * * *